Oct. 18, 1932. R. J. SHOLTZ 1,883,017
MATERIAL WEIGHING AND CONTROL APPARATUS
Filed July 8, 1929
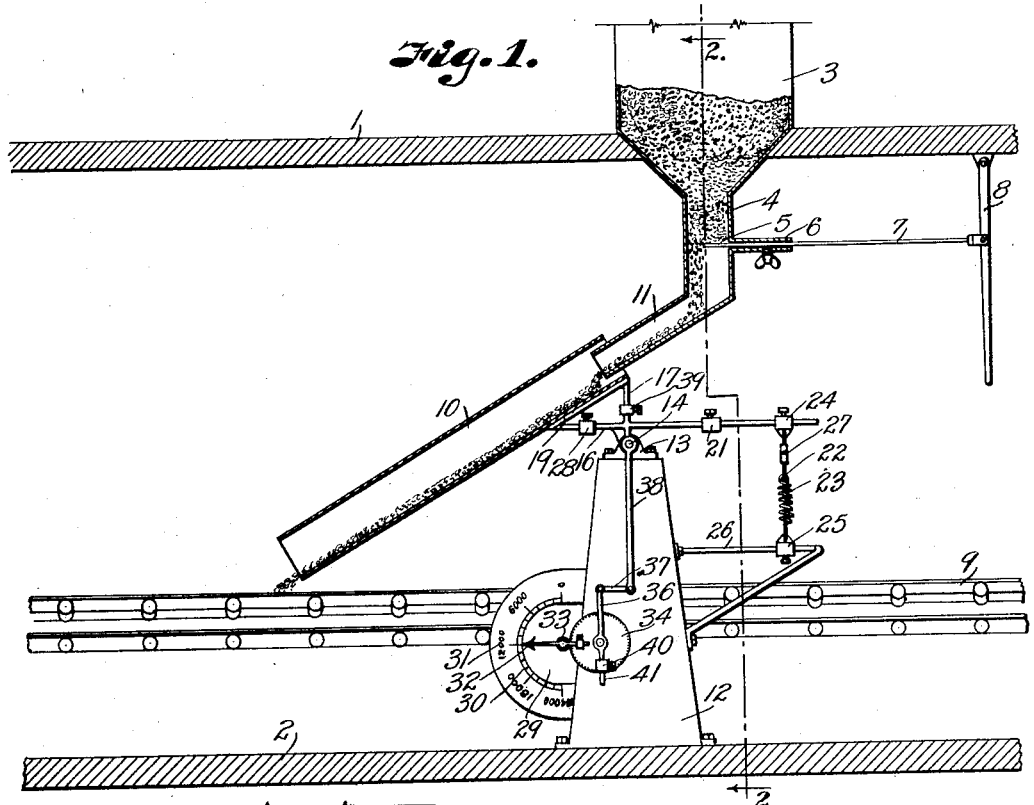
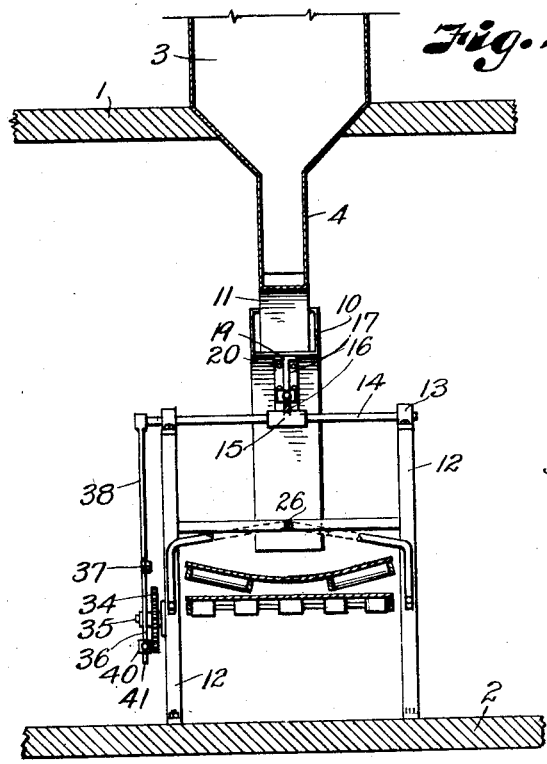
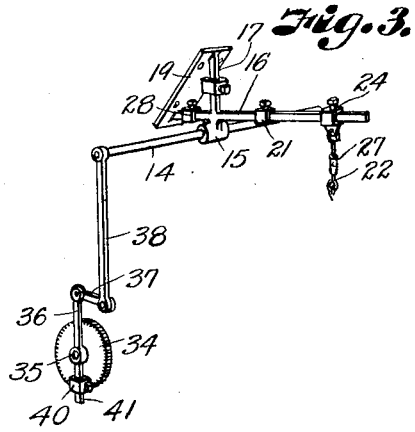
INVENTOR
Richard J. Sholtz
BY
ATTORNEY Patented Oct. 18, 1932

1,883,017

UNITED STATES PATENT OFFICE

RICHARD J. SHOLTZ, OF KANSAS CITY, MISSOURI, ASSIGNOR OF ONE-THIRD TO CLARENCE M. HARDENBERGH AND ONE-THIRD TO EMANUEL M. RACZ, BOTH OF KANSAS CITY, MISSOURI

MATERIAL WEIGHING AND CONTROL APPARATUS

Application filed July 8, 1929. Serial No. 376,761.

My invention relates to material weighing and control apparatus and more particularly to apparatus for delivering grain in flour milling operations, the principal objects of the invention being to measure the rate of flow of streams of wheat toward receivers, to indicate variations in the rate of flow of a stream of grain, and to control a plurality of streams of grain for proportionate flow in grain mixing operations and thereby enable an operator to detect and correct variations from pre-determined rates of flow of various grades of grain being mixed.

In accomplishing these and other objects of the invention, I have provided improved details of structure, the preferred forms of which are illustrated in the accompanying drawings, wherein:

Fig. 1 is a side elevation partly in section of proportionate flow control apparatus including the conveyor shown fragmentarily.

Fig. 2 is an end view of the apparatus.

Fig. 3 is a perspective view of portions of a rocking shaft supporting an arm on which a grain chute is mounted and indicator operating mechanism actuated by the rocking shaft.

Referring in detail to the drawing:

1 and 2 designate parallel horizontal walls such as adjacent floors of a building adapted for milling operations and representing the portion of the building connected with grain storage. 3 designates a source of wheat, for example, a bin or storage hopper supported by the upper floor 2 and provided with a vertical discharge mouth or conduit 4. An adjustable slide valve 5 comprising a plate or gate slidable in a guide 6 horizontally into and out of the vertical conduit is operable through a rod 7 and lever 8 pivoted to the upper floor for varying the effective area of the conduit and controlling flow of grain by gravity toward a belt conveyor 9 adapted to move horizontally adjacent the floor 1.

A delivery chute or weighing spout 10 which may comprise a tubular conduit having rectangular cross section is adapted for support in an inclined position as presently described, in receiving relation with a throat 11 extending angularly from the bottom end of the discharge conduit 4, the throat preferably having substantially smaller diameter than the conduit or spout whereby the spout may move pivotally out of alignment with the throat without disturbing the passage of grain from the hopper toward the conveyor.

Mounted on the floor are spaced pedestals or standards 12 extending upwardly substantially beyond the level of the conveyor and provided with blocks 13 comprising ball bearing housings to receive a rock shaft 14 and thereby comprise a support for the spout.

Fixed to the shaft 14 intermediately between the standards 12 is a sleeve or collar 15 and fixed to the collar is a bracket comprising a lever arm 16 extending at right angles to the shaft in both directions therefrom and a vertical bar 17. The forwardly extending portion 18 of the lever arm and the vertical bar 17 have outer ends secured to the spout 10 by a plate 19 mounted on the beveled end edges of the members and adapted to be secured to the spout by rivets 20.

A balance weight 21 is slidably mounted on the rearwardly projecting lever arm 16 for counterbalancing the weight of the spout on the rocking support.

A weight resisting member 22 preferably including a spring 23 is connected with the rearwardly projecting portion of the lever arm and adapted to indicate the weights of portions of grain moving through the spout and contained therein at any moment, as presently described. The weight indicating resistance member preferably includes a guide sleeve 24 slidable on the rear end of the lever arm, an opposite sleeve 25 slidable on and retained by a bar 26 projecting horizontally from one of the supporting standards, and a turn buckle 27 for adjusting the tension of the spring.

The weight resisting member is adapted for adjustment to retain the spout in a predetermined inclined position under the influence of a predetermined amount of grain in the spout and under influence of a stream of grain flowing at a predetermined rate through the spout to the conveyor.

It is apparent that relatively small changes in the degree of inclination of the spout would vary greatly the correctness of weight indications and it is therefore desirable that means be provided for assuring the tilting of the spout at substantially the angle calculated to permit flow at a rate for correctly resisting the influence of the member 22.

I therefore provide a weight 28 slidable on the front end of the lever for adjusting the inclination of the spout to a desired inclined position, and particularly to adjust the position of the rocking shaft for setting an indicator presently described.

Mounted on the outer pedestal 12 and preferably on a plate 29 projecting forwardly therefrom is a scale 30 having semi-circularly arranged graduations provided with indicia 31 from zero at one end to a maximum at the other end, and a pointer 32 comprising an arrow or finger fixed to a pinion 33 pivotally mounted on the plate, is adapted to be moved rotatively by a gear 34 rotatably mounted on the pedestal and operated by the rock shaft for indicating the rate of flow of wheat through the spout. The gear is mounted on a shaft 35, and a lever 36 fixedly connected with the gear is operable through a link 37 pivotally connected to the gear lever and to a shaft lever 38 keyed to the outer end of the rock shaft 14.

A counterbalance weight 39 is slidable on the upwardly projecting arm 17 of the spout support bracket and a similar weight 40 is slidable on the downwardly projecting end 41 of the gear lever 36 for stabilizing the operations of the several levers.

In using apparatus constructed and assembled as described, the setting of the adjustable slide valve 5 is initially determined for permitting flow of grain at a predetermined rate through the vertical conduit and inclined reduced throat, for example to permit the flow of a predetermined number of bushels per hour, of grain having known or unknown weight per bushel, in a manner now to be described. The spout will be initially balanced on the bearings 13 by adjustment of the balancing weight 21.

The balancing tension spring 22 will then be adjusted by manipulation of the turn buckle and by sliding of the spring guides on the balancing lever and bar 26 so that when wheat is flowing at the desired rate measured in pounds per hour, the spout will be tilted in such a position that the rock shaft lever will actuate the pointer to indicate the number of pounds per hour or the number of bushels at 60 pounds per bushel, being delivered per hour.

The weight 28 is then adjusted to cause the pointer to indicate zero on the scale and flow of wheat is set up by opening the slide valve.

The stream of wheat will therefore effect operation of the indicator by causing the lower end of the spout to be depressed and the rocking shaft to rock, and the pointer will indicate the rate of flow of the grain, the valve being then adjusted to cause the pointer to indicate the predetermined rate of flow. Should the rate of flow change, due for example to wearing of the slide valve under the impact of the grain, the spout will rock slightly, for example the lower end being depressed a fraction of an inch, and the pointer will therefore be deflected from its normal position and will indicate the flow of grain of greater weight than that for which the apparatus was set. Warning will thus be given that the slide valve should be manipulated to limit the movement of grain.

What I claim and desire to secure by Letters Patent is:

1. In grain delivering apparatus of the character described including a hopper having a discharge conduit provided with an inclined throat, a valve in the conduit for regulating the rate of flow of grain therethrough, an inclined spout sleeved loosely over said throat, means pivotally supporting the spout, yielding means resisting pivotal movement of the spout, and means responsive to grain moving through the spout for indicating the rate of movement of said grain.

2. In apparatus of the character described including a storage hopper having a discharge conduit and a valve in the conduit for regulating flow of grain therethrough, a spout in receiving relation with said conduit, means pivotally supporting the spout, and means including a spring having adjustable connection with said spout supporting means for indicating the rate of flow of grain through the spout.

3. In apparatus of the character described including a hopper having a discharge conduit and a valve in the conduit for regulating flow of grain therethrough, a spout in receiving relation with said conduit, means supporting the spout, and means including a spring having adjustable connection with said spout supporting means for indicating the rate of flow of grain through the spout.

4. In apparatus of the character described including a hopper having a vertical discharge conduit and a valve in said conduit, a spout in receiving relation with the conduit, means for supporting the spout in inclined position including a transverse oscillating shaft, weighing means connected with the spout, and means operable by the shaft for indicating the extent of oscillation of the shaft, to indicate the rate of flow of grain through the spout.

5. In apparatus of the character described including a hopper having a vertical discharge conduit and a valve in said conduit, a spout in receiving relation with the conduit, means for supporting the spout in inclined position including a transverse rocking shaft, and a bar fixed to the shaft having one end connected with the spout, weighing means connected with the opposite end of the bar, and means operable by the shaft for indicating the rate of flow of grain through the spout.

6. In apparatus of the character described including a hopper having a vertical discharge conduit and a valve in said conduit, a spout in receiving relation with the conduit, means for supporting the spout in inclined position including a transverse rocking shaft, and a bar fixed to the shaft having one end connected with the spout, means for counterbalancing the weight of the spout, weighing means connected with the opposite end of the bar, and means operable by the shaft for indicating the degree of oscillation of the shaft under pressure of grain moving through the spout.

7. In apparatus of the character described, a supply hopper having a vertical discharge chute, a valve in said chute for controlling flow of grain from the hopper, a delivery spout in receiving relation with the discharge conduit, means supporting the spout including a rocking shaft, a horizontal bar positioned perpendicularly to the shaft having an inner end extending on one side of the shaft and fixed to the spout, and an outer end extending on the other side of the shaft and provided with means for counterbalancing the weight of the spout, a resistance member connected with the outer end of the bar and adjustable to counterbalance the weight of grain moving through the spout, and means including a pointer responsive to rocking movement of the shaft for indicating variation in weight of grain moving through the spout.

8. In material weighing and control apparatus, a support, an inclined elongated material conducting member pivotally mounted on the support for free flow of material thereover, means resisting pivotal movement of said member and freely yielding to permit flow of material thereover at various rates, means for disclosing the rate of flow of said material, and adjustable means for delivering material to said member for effecting flow of said material thereover at a predetermined rate.

In testimony whereof I affix my signature.

RICHARD J. SHOLTZ.